Aug. 25, 1953 E. P. MOSLO 2,649,621
MOLDING MACHINE
Filed Dec. 15, 1949 5 Sheets-Sheet 1

INVENTOR.
ERNEST P. MOSLO
BY
Hyde, Meyer, Baldwin & Doran
ATTORNEYS

Aug. 25, 1953 E. P. MOSLO 2,649,621
MOLDING MACHINE
Filed Dec. 15, 1949 5 Sheets-Sheet 2

INVENTOR.
ERNEST P. MOSLO
BY
Hyde, Meyer, Baldwin & Doran
ATTORNEYS

INVENTOR.
ERNEST P. MOSLO
BY
Hyde, Meyer, Baldwin & Doran
ATTORNEYS

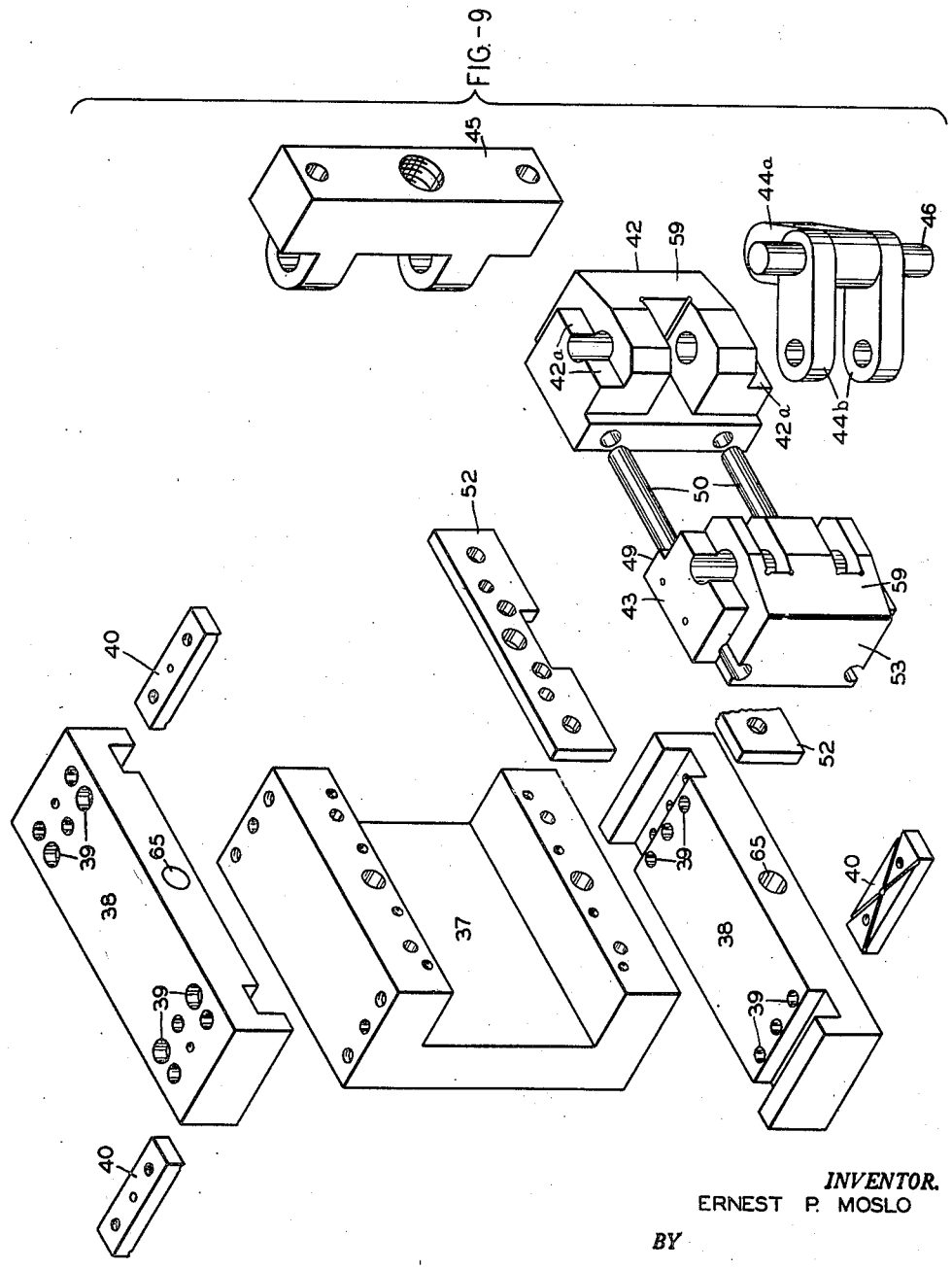

Patented Aug. 25, 1953

2,649,621

UNITED STATES PATENT OFFICE 2,649,621

MOLDING MACHINE

Ernest P. Moslo, Cleveland Heights, Ohio

Application December 15, 1949, Serial No. 133,060

6 Claims. (Cl. 18—30)

This invention relates to improvements in a molding machine and more particularly a machine of the type adapted to mold synthetic plastic material.

One of the objects of the present invention is to provide a complete mold clamp assembly in its own housing which, in turn, is mounted upon the main frame of the molding machine for adjustment in horizontal and vertical operating positions or at any angle between the horizontal and vertical.

A further object of the present invention is to provide such a mold clamp assembly which is universally adjustable to any desired angle together with manipulating mechanism which may be quickly set to hold the device in any desired position and which is self-locking when that position is reached.

Another object of the present invention is to provide a novel mold clamp for holding the die blanks together during an injection operation which operates through a positive mechanical combination toggle and wedge lock which eliminates the necessity for holding hydraulic pressure on the mold clamp during the injection cycle.

A further object of the present invention is to provide a novel mold clamp of the type described in the preceding paragraph wherein a pair of wedge blocks are directly connected to a toggle mechanism, the wedge blocks being operable by the toggle to force the wedge blocks beneath a coacting abutment, the angle between the wedge block and the abutment being such as to firmly hold the mold closed in resistance against the back pressure exerted during an injection operation. My invention includes the use of strong compact wedge blocks which are firmly held in a manner later described so that the entire device is inexpensive and sturdy and will render efficient operation over long periods of time without any repairs.

Other objects and advantages of the present invention will be apparent from the accompanying drawings and description and the essential features will be set forth in the appended claims.

Figure 1:
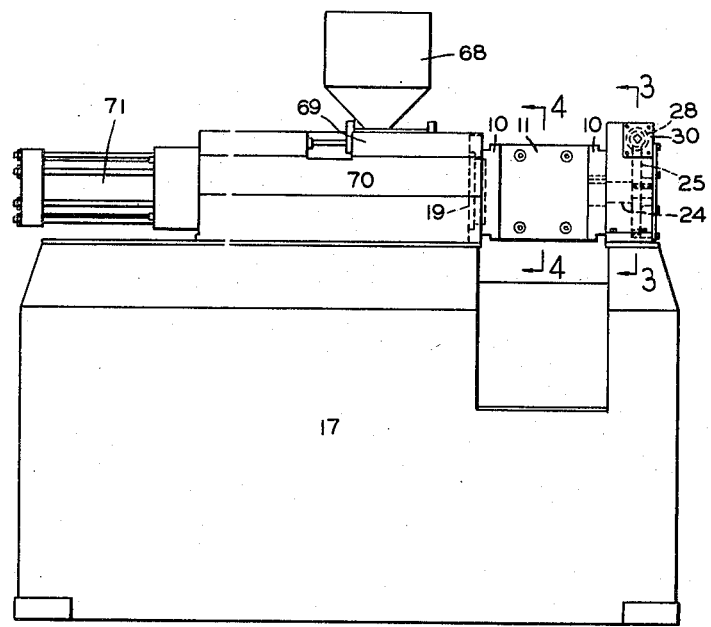
Fig. 1 is a side elevational view of a molding machine equipped with my invention and showing the mold clamping assembly in horizontal position.
Figures 2, 3:
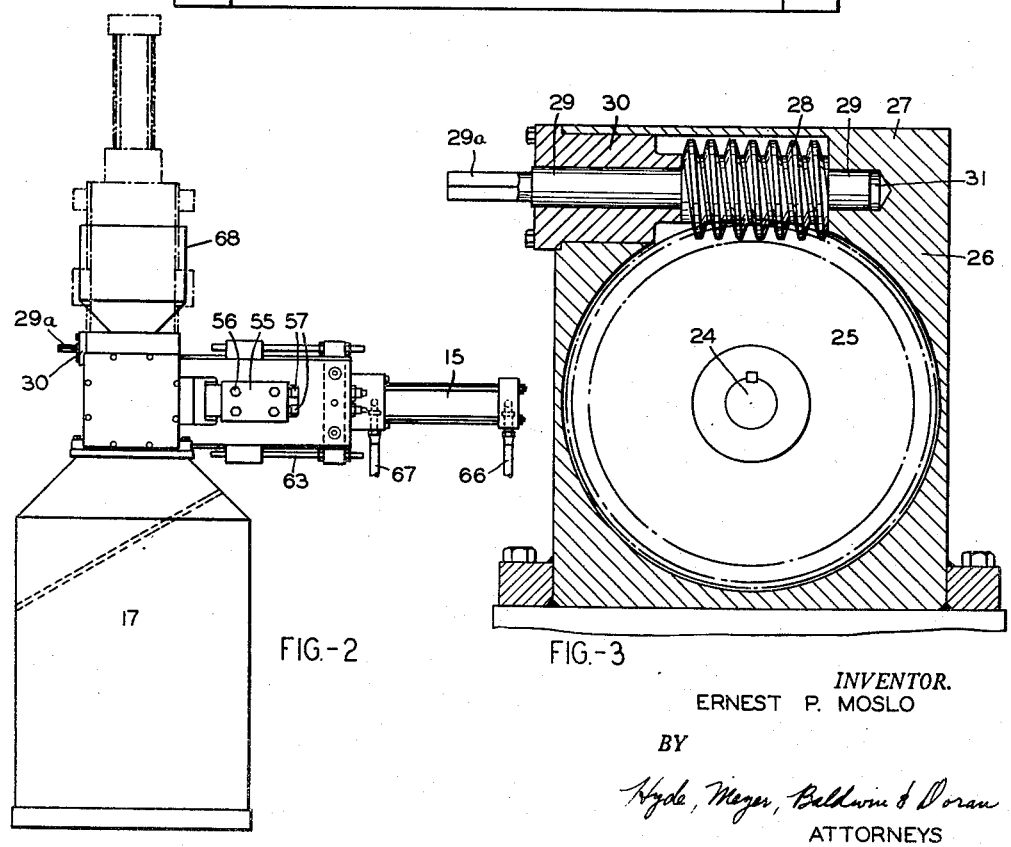
Fig. 2 is an end elevation of the same taken at the right-hand end of Fig. 1 and showing in full lines the mold clamping assembly in horizontal position and showing in dot-dash lines the mold clamping assembly in vertical position.
Fig. 3 is a fragmental transverse sectional view enlarged taken along the line 3—3 of Fig. 1.
Figure 4:
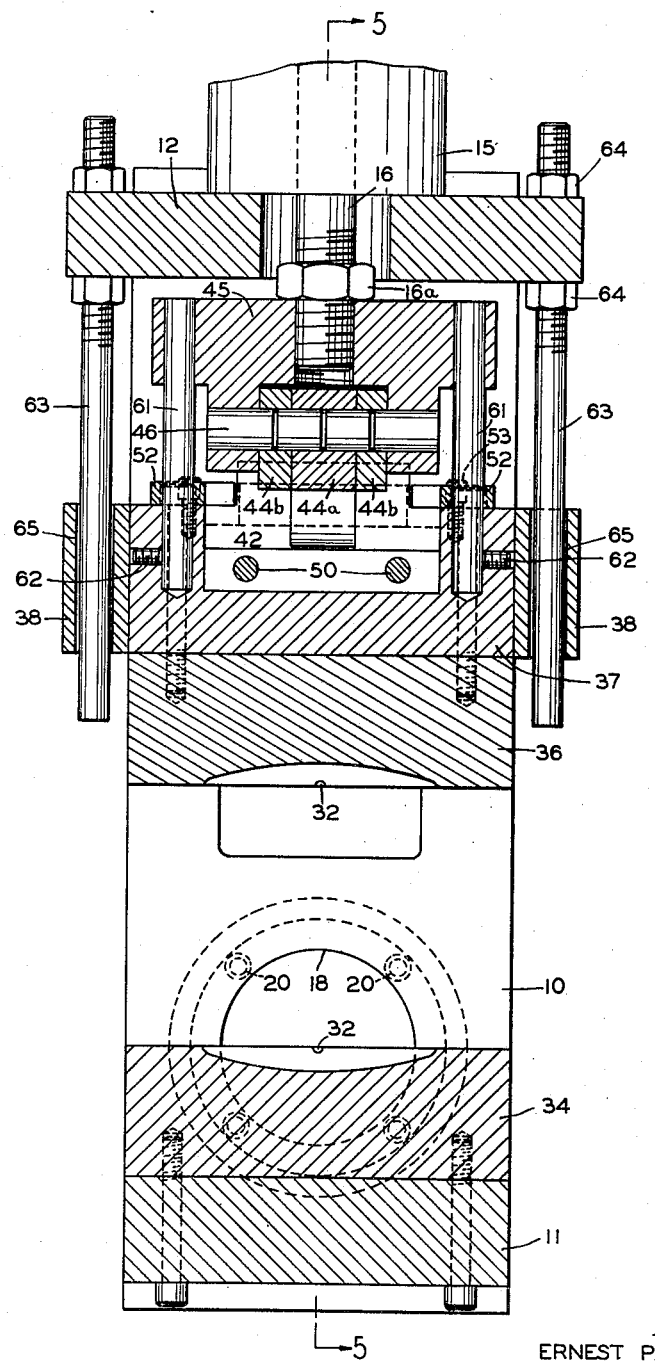
Fig. 4 is a transverse sectional view enlarged taken along the line 4—4 of Fig. 1.
Figure 5:
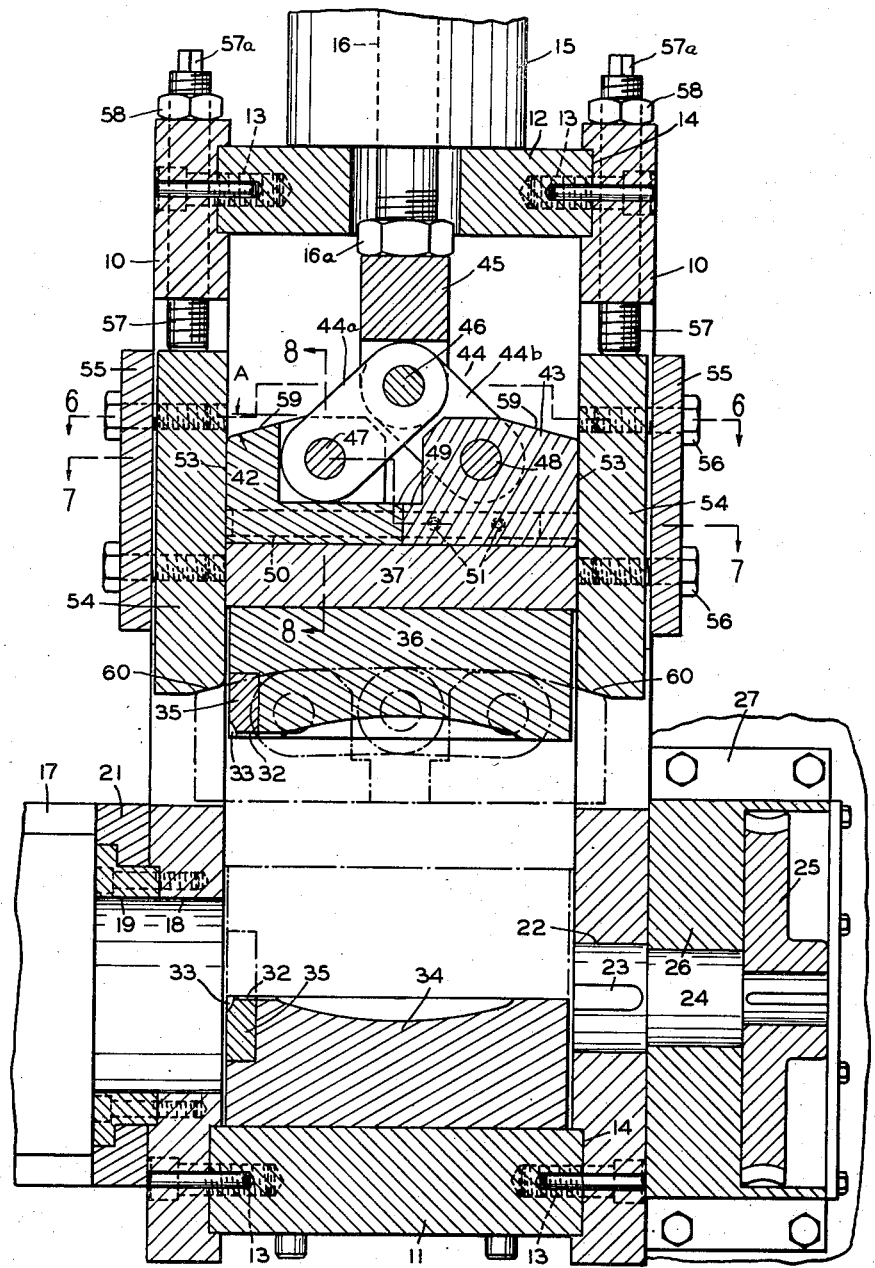
Fig. 5 is a transverse sectional view taken along the line 5—5 of Fig. 4.
Figure 6:
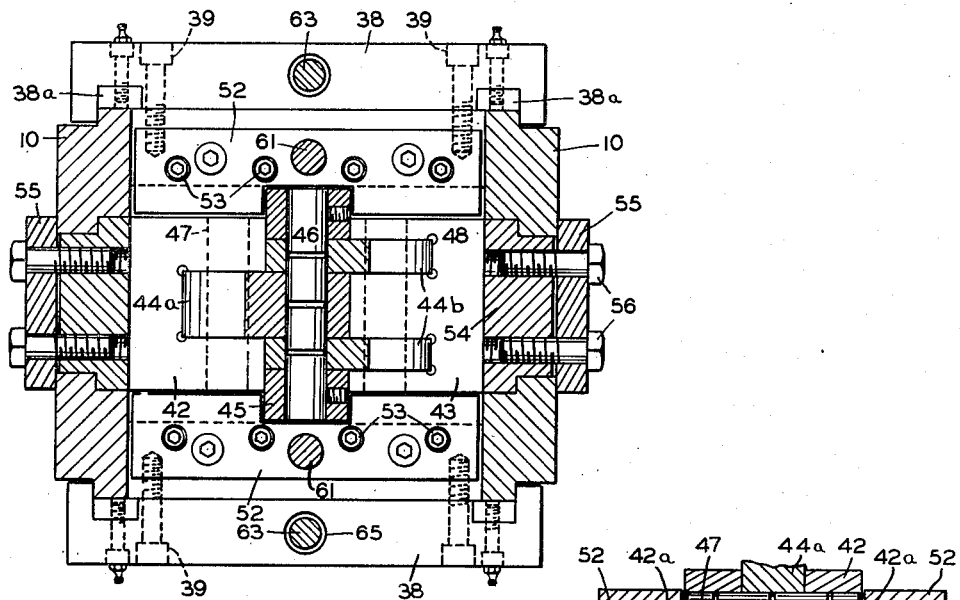
Figure 8:
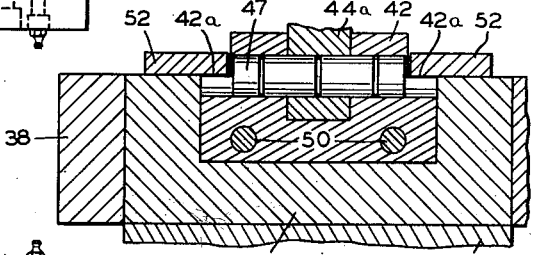
Figure 7:
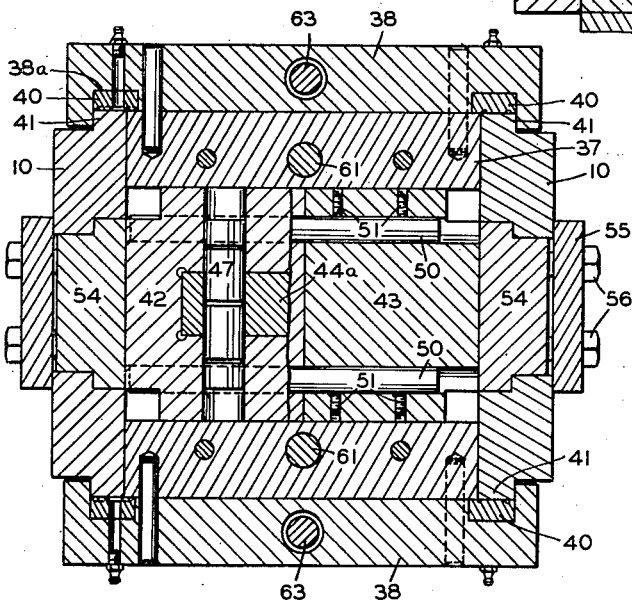

Figs. 6 and 7 are transverse sectional views taken along the lines 6—6 and 7—7 respectively of Fig. 5;

Fig. 8 is a fragmental sectional view taken along the line 8—8 of Fig. 5; while

Fig. 9 is an exploded view showing in perspective certain of the parts associated with the wedge blocks and the movable die plate.

It is well known in the plastic molding art that it is sometimes desirable to hold the mold clamp assembly in a horizontal position for one molding operation, whereas in another molding operation, it is desirable to have the mold clamp assembly in a vertical position. There are also other situations where it is desirable to form the injection cycle with the mold held at an angle between the horizontal and vertical. For instance, when an insert is to be molded into the plastic material, with the assembly in a vertical position, the inserts may be placed in the lower half of the mold, eliminating the possibility of inserts shifting or falling out of position and damaging an expensive mold. This often happens in a machine of the conventional type. On the other hand, certain molds, not requiring inserts, are more efficiently filled during the injection cycle if the mold clamp assembly is set in a horizontal position. On other intricate molding operations, where it is desirable to inject at an angle, my improved machine, adjustable to any desired angle, fulfils the need. With its greater visibility, automatic ejection of the formed parts in my improved machine offers no problems. The mold clamp assembly may be set at any desired angle to prevent ejected shots from dropping into the mold cavity. Also, mold set-up problems are greatly simplified with my device because the molds may be installed when the clamp assembly is in its vertical position, regardless of the injecting position later assumed. This eliminates the necessity of lifting and blocking equipment to hold the mold in position and this results in the equipment being shut down for shorter periods of time when changing molds.

The mold clamp assembly which is shown in great detail in Figs. 4 to 9 inclusive is completely held in its own frame which comprises two side plates 10 which extend substantially the full width and full length of the mold assembly and which are rigidly held together by a base plate 11 at one end and an end plate 12 at the opposite end. Each of these base and end plates is held in position by a plurality of cap screws 13. It will be noted also that the base and end plates are recessed into the side plates in a snugly fitting fashion as indicated at 14 and this adds to the strength of the complete mold clamp housing. The end plate has rigidly secured to it the hydraulic cylinder 15 which houses a double acting piston (not shown) which acuates the piston rod 16 which is connected to the mold clamping mechanism as will be later described.

The above described mold clamp assembly housing is rotatably mounted on the main frame 17 of the molding machine for oscillation about the axis of the injection nozzle as is clearly shown in Figs. 1, 2, 3, 4 and 5. To this end, the lefthand side plate 10, as viewed in Fig. 5, has a circular through opening 18 at its lower end, opposite the position of the die blanks, and a pivot ring 19 is secured to the side plate concentric with the opening 18 by means of the cap screws 20. The pivot ring coacts with a clamping ring 21 which is secured to the main frame 17 of the molding machine by means not shown. The right-hand side plate 10 as viewed in Fig. 5 is provided with a circular opening 22 which is coaxial with the opening 18. A seat is provided in the side plate 10 at this point to receive the key 23 which is carried by a shaft 24, the opposite end of which has keyed to it a worm gear 25. A bearing block 26 in the housing 27 provides a bearing for the shaft 24. A worm 28 is rotatably mounted in the housing 27 to coact with the worm gear 25. As clearly shown in Fig. 3, the worm 28 is rigidly mounted on a shaft 29 which is mounted in a bearing block 30 and the inner end of shaft 29 is received in a recess 31 in the bearing block 26. The outer end of shaft 29 is squared as shown at 29a to receive a crank by means of which the worm 28 may be turned. It results from this construction that rotation of the shaft 29 causes the worm 28 to rotate the worm gear 25 which in turn causes shaft 24 to oscillate and this carries the mold clamp assembly as it oscillates about the axis of the openings 18 and 22. The mold clamp assembly may thus be placed in the horizontal position as shown in full lines in Fig. 2 or in the vertical position as shown in dot-dash lines there, or it may be adjusted at any angle between these two positions. Because of the worm and worm gear arrangement, the device is non-reversible and the worm and worm gear will hold the mold clamp assembly in any position to which it is moved by rotation of the shaft 29. Referring to Fig. 5, it will be noted that the injection opening where the plastic material enters the mold as indicated at 32 lies on the axis of the openings 18 and 22. Those familiar with this art will understand that the nose of the plasticizing cylinder (not shown in Fig. 5) will lie in the opening 18 with the injection nozzle tightly fitting in the spherical-shaped opening 33 leading to the injection opening 32. With this arrangement, the mold clamp assembly may be moved at any angle without disturbing the position of the parts for producing an injection cycle.

The lower die blank 34 is secured to the base plate 11 in the usual manner as, for instance, by means of cap screws. Half of the nozzle plate 35 is secured to the die blank 34 in the usual manner and is provided with openings 32 and 33 as previously described. Knockout pins and an ejector plate might be provided beneath the die blank 34 in the usual manner if desired. This has no part in the present invention and therefore such construction is not shown. The movable die blank 36 carries the other half of nozzle plate 35. The movable die blank is secured in the usual manner as, for instance, by cap screws to the movable die plate 37. As clearly shown in Fig. 9, the movable die plate is of channel form opening upwardly and the wedge blocks reciprocate in this channel. Movable die plate gibs 38 are secured to opposite sides of the movable die plate 37 by means of cap screws passing through the openings 39. These gibs are recessed at 38a to receive gib bearings 40. The side plates 10 are provided with parallel ways 41 along which the gibs slide as the movable die plate is reciprocated.

A pair of wedge blocks, 42 and 43, are mounted back to back in the channel formed in the upper face of the movable die plate 37. A toggle 44, composed of links 44a and 44b, is connected between the wedge blocks and a toggle yoke 45. This toggle yoke, as clearly shown in Fig. 4, has a threaded connection with the lower end of the piston rod 16 and after the toggle yoke is moved to its properly adjusted position it is held there by means of a lock nut 16a. A toggle yoke pin 46 connects the toggle links to the yoke and wedge block pins 47 and 48 connect links 44a and 44b respectively with wedge blocks 42 and 43. As clearly shown in Fig. 6, the links 44b are divided and lie on opposite sides of the link 44a but this is merely for the purpose of balancing the thrust outwardly and the links will be spoken of as though they were two simple links of a toggle mechanism. Projections 49 on the lower inner faces of the wedge blocks limit their movement toward each other as clearly shown in Fig. 5. The wedge blocks 42 and 43 are held in alinement during movement toward and away from each other by means of a pair of pins 50 (Fig. 7) which are held in one of the wedge blocks by set screws 51 and extend slidably into the other wedge block.

As is clearly evident in the drawings, particularly in Figs. 5 and 9, the wedge blocks are of sturdy compact construction and are connected to the strong toggle yoke by means of short sturdy toggle links. This gives a long life with little trouble in the operation of the machine. As clearly shown in Figs. 4, 6 and 9, a pair of wedge block gibs 52 are secured to the movable die plate 37 by means of cap screws 53 and these hold the wedge blocks in the movable die plate and at the same time hold the movable die plate for movement in unison with the toggle yoke and toggle. These gibs 52 bear against flat surfaces on the tops of the wedge blocks as indicated at 42a in Fig. 9. Each wedge block has a flat bottom horizontal face which slides in the channel of die plate 37. Each wedge block has a vertical outer end face 53 which rides along the inner face of a wear plate 54, there being one of these wear plates slidably mounted for vertical movement in each of the side plates 10. As clearly shown in Figs. 6 and 7, each of the wear plates 54 is generally of T-shape with the wider dimension toward the inside and slidable in similarly formed ways in the side plate. A wear plate clamp 55 bears against the outer face of each of the side plates 10 and screws 56, passing freely through openings in the clamp and threaded into the wear plate 54 hold the wear plate in any position to which it is adjusted. Wear plate adjusting screws 57, two on each side, extend vertically above the wear plates through suitable openings in the side plates 10 and extend out the top of the side plates. These screws have threaded engagement with the side plates and are adjustable by means of squared ends 57a to which wrenches may be applied. They are held in any desired position by lock nuts 58. The upper outer surface of each of the wedge blocks 42 and 43 comprises a flat inclined face 59 which slopes outwardly and downwardly at an angle A of approximately fifteen degrees from the horizontal. The inner lower edge of each of the wear plates 54 is provided with an inclined face 60 which is complementary to the surfaces 59 so that they will slide freely thereover. The inner faces of the wear plates 54 and the surfaces 53, 59 and 60 are hardened to resist wear and abrasion. It should now be evident that as the parts move from the full line position of Fig. 5 to the dot-dash position there shown, the toggle links 44a and 44b cause the wedge blocks 42 and 43 to move downwardly between the wear plates 54 with the vertical faces 53 engaging the wear plates. The toggle cannot expand until the surfaces 59 of the wedge blocks clear the surfaces 60 at the bottom of the wear plates at which time the toggle links are straightened, causing the surfaces 59 and 60 to exert a tremendous wedging action causing the die blanks 34 and 36 to be pressed very tightly together. The parts are so adjusted that the toggle reaches substantially a dead center position where the axes of pins 46, 47 and 48 are in alinement. In this position of the parts, as illustrated in dot-dash lines in Fig. 5, the die blanks are held tightly clamped together and the fluid pressure in the cylinder 15 need not be maintained during the injecting operation. This structure is so effective that in the first mold I constructed, the clamp held the mold closed when the casting area of the mold was twice as great as I would have regarded as satisfactory under normal conditions. The mold was held so tightly closed that there was no flash whatsoever between the die blanks here indicated at 34 and 36.

Two parallel vertical pins 61 are secured by set screws 62 in the movable die plate 37 and extend upwardly through suitable openings in the toggle yoke 45 in which the pins are freely slidable. These pins 61 guide the toggle yoke during its reciprocation.

A pair of ejector rods 63 are fixed to the end plate 12 by means of lock nuts 64 and extend downwardly through openings 65 in the gibs 38. There is a slight clearance at this point so that the gibs ride freely along the rods 63. These rods are intended to coact with an ejector plate associated with the movable die blank 36 where such an ejector plate is used to strike the knockout pins as the mold clamp is opened. No such construction is shown in the present instance because it has nothing to do with the present invention.

The operation of my device should now be apparent from the above description. By applying a crank to the end 29a of the shaft 29 the worm wheel 25 is rotated to oscillate the mold clamp assembly to the desired position either horizontally as shown in full lines in Fig. 2 or vertically as shown in dot-dash lines there, or at some angle in between. It should be understood that mounted on the main frame there is a feed hopper 68, a charge measuring device 69, and below this a housing 70 in which is a plasticizing cylinder of known type leading to an injection nozzle which coacts with the openings 32 and 33 previously described. A ram 71 operates in the usual manner to force a charge of plasticized material into the mold when desired. Either manually or automatically, pressure fluid from a source not shown is fed through line 66 of Fig. 2 to the outer or upper end of the cylinder 15 causing the piston to move downwardly or inwardly carrying the toggles from the full line position of Fig. 5 to the dot-dash position there shown, closing the mold. After the mold has been closed long enough for the material to have become set by the heat applied, pressure fluid is supplied to the conduit 67 of Fig. 2 to the opposite end of the piston in cylinder 15, by control means not shown, so as to open the mold to the full line position of Fig. 5. The molded part is then removed and the cycle is repeated.

What I claim is:

1. In combination, a molding machine including a main frame, a plasticizing cylinder mounted thereon and means on said frame for injecting heated plastic from said cylinder into a mold, said means terminating in an injection nozzle, a mold and clamp assembly having means for holding coacting die blanks and clamp means for advancing and retracting one of said die blanks and for holding said blanks tightly clamped together, and pivotal mounting means for said assembly on said frame pivoting said assembly for oscillation in a vertical plane, the pivotal axis of said mounting means being alined with said nozzle, and means for holding said assembly in vertical or horizontal position.

2. In combination, a molding machine including a main frame, a plasticizing cylinder mounted thereon and means on said frame for injecting heated plastic from said cylinder into a mold, said means terminating in an injection nozzle, a mold and clamp assembly having means for holding coacting die blanks and clamp means for advancing and retracting one of said die blanks and for holding said blanks tightly clamped together, and pivotal mounting means for said assembly on said frame pivoting said assembly for oscillation in a vertical plane, the pivotal axis of said mounting means being alined with said nozzle, and means for holding said assembly in any position between vertical and horizontal.

3. In combination, a molding machine including a main frame, a plasticizing cylinder mounted thereon and means on said frame for injecting heated plastic from said cylinder into a mold, said means terminating in an injection nozzle, a mold and clamp assembly having means for holding coacting die blanks and clamp means for advancing and retracting one of said die blanks and for holding said blanks tightly clamped together, and pivotal mounting means for said assembly on said frame pivoting said assembly for oscillation in a vertical plane, the pivotal axis of said mounting means being alined with said nozzle, coacting worm and worm gear elements, said worm element fixed relative to said frame, said worm gear element oscillatable with said assembly, and means for turning said worm.

4. In combination, a molding machine including a main frame, a plasticizing cylinder thereon and means on said frame for injecting heated plastic from said cylinder into a mold, said means terminating in an injection nozzle, a mold and clamp assembly adapted to hold die blanks forming a mold, said assembly having clamp means for advancing and retracting one of said die blanks toward and from another of said die blanks and for holding said blanks tightly clamped together, said mold when said blanks are clamped together being positioned to receive plastic from said nozzle, a pivot mounting for said assembly on said frame axially alined with said nozzle pivoting said assembly for oscillation in a vertical plane, and means for holding said assembly in various adjusted positions radially about said mounting.

5. In combination, a molding machine including a main frame, a plasticizing cylinder thereon and means on said frame for injecting heated plastic from said cylinder into a mold, said means terminating in an injection nozzle, a mold and clamp assembly adapted to hold die blanks forming a mold, said assembly comprising two parallel side plates extending from end to end thereof, a base plate at one end of said assembly and an end plate at the opposite end rigidly secured to said side plates, a stationary die blank secured to said base plate, a movable die plate mounted in said assembly for reciprocation parallel to said side plates, a movable die blank secured to said die plate and movable thereby away from and into engagement with said stationary die blank, said blanks in engagement having a plastic injection gate in communication with said nozzle, a cylinder and piston device mounted on said end plate and having a piston rod reciprocable parallel to said side plates, a pair of wedge blocks carried by said die plate and mounted therein for reciprocation at right angles to said side plates, a toggle connection between said piston rod and said wedge blocks for reciprocating the latter, wear plates carried by said side plates, coacting wedge surfaces on said blocks and wear plates engageable by straightening of said toggle connection for wedging said die blanks together, pivot connections between each of said side plates and said main frame axially alined with said nozzle pivoting said assembly for oscillation in a vertical plane, and means for holding said assembly in a plurality of positions between vertical and horizontal.

6. In combination, a molding machine including a main frame, a plasticizing cylinder mounted thereon and means on said frame for injecting heated plastic from said cylinder into a mold, said means terminating in an injection nozzle, a mold and clamp assembly having means for holding coacting die blanks and clamp means for advancing and retracting one of said die blanks in a path and for holding said blanks tightly clamped together at a predetermined point in said path, and swingable mounting means for said assembly on said frame, said mounting means having one position with said point at the level of said nozzle and with said die blank path along said assembly extending substantially vertically and said mounting means having another position with said point at the level of said nozzle and with said die blank path along said assembly extending substantially horizontally.

ERNEST P. MOSLO.

References Cited in the file of this patent

UNITED STATES PATENTS

| Number | Name | Date |
|---|---|---|
| 2,094,079 | Parker | Sept. 28, 1937 |
| 2,131,955 | Johnson | Oct. 4, 1938 |
| 2,298,043 | Dinzl | Oct. 6, 1942 |
| 2,334,372 | Abbott et al. | Nov. 16, 1943 |
| 2,358,686 | Caron | Sept. 19, 1944 |